US012711684B2

(12) United States Patent
Liu et al.

(10) Patent No.: US 12,711,684 B2
(45) Date of Patent: Aug. 18, 2026

(54) METHOD, APPARATUS, DEVICE, READABLE STORAGE MEDIUM AND PRODUCT FOR DISPLAYING VIRTUAL OBJECT

(71) Applicants: Beijing Zitiao Network Technology Co., Ltd., Beijing (CN); Lemon Inc., Grand Cayman (KY)

(72) Inventors: Jiacheng Liu, Beijing (CN); Fan Zhang, Beijing (CN)

(73) Assignees: Beijing Zitiao Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 117 days.

(21) Appl. No.: 18/763,893

(22) Filed: Jul. 3, 2024

(65) Prior Publication Data

US 2025/0014251 A1 Jan. 9, 2025

(30) Foreign Application Priority Data

Jul. 3, 2023 (CN) ......................... 202310809498.5

(51) Int. Cl.
*G06T 13/00* (2011.01)
*G06T 7/20* (2017.01)

(52) U.S. Cl.
CPC ................ *G06T 13/00* (2013.01); *G06T 7/20* (2013.01); *G06T 2200/24* (2013.01); *G06T 2207/20092* (2013.01)

(58) Field of Classification Search
CPC ......... G06T 11/001; G06T 13/00; G06T 7/20; G06T 2200/24; G06T 2207/20092; G11B 27/031
See application file for complete search history.

(56) References Cited

U.S. PATENT DOCUMENTS

| | | | | |
|---|---|---|---|---|
| 2016/0267699 | A1* | 9/2016 | Borke | G06F 3/017 |
| 2021/0150731 | A1* | 5/2021 | Saquib | G06F 3/017 |
| 2024/0420435 | A1* | 12/2024 | Gitter | G06F 3/011 |

FOREIGN PATENT DOCUMENTS

| | | | |
|---|---|---|---|
| CN | 110022363 | A | 7/2019 |
| CN | 110052027 | A | 7/2019 |

* cited by examiner

*Primary Examiner* — Nelson M Rosario
(74) *Attorney, Agent, or Firm* — Alleman Hall LLP

(57) ABSTRACT

There are provided a method for displaying a virtual object, apparatus, device, readable storage medium and product. The method includes: obtaining an effect processing request triggered by a user, the effect processing request comprising identification information of target effect; displaying, in a media content generating page, at least one target image frame and a virtual object associated with the target effect; determining a first motion parameter of the virtual object in a first direction based on the at least one target image frame, and determining a second motion parameter of the virtual object in a second direction based on predetermined content associated with the virtual object; and driving, through a predetermined dynamic component, the virtual object to move according to the first motion parameter and the second motion parameter, the predetermined dynamic component being on a skeleton node corresponding to the virtual object.

17 Claims, 6 Drawing Sheets

METHOD, APPARATUS, DEVICE, READABLE STORAGE MEDIUM AND PRODUCT FOR DISPLAYING VIRTUAL OBJECT

CROSS REFERENCE

This application claims priority to Chinese Patent Application No. 2023108094985, filed with the Chinese Patent Office on Jul. 3, 2023, and entitled "METHOD, APPARATUS, DEVICE, READABLE STORAGE MEDIUM AND PRODUCT FOR DISPLAYING VIRTUAL OBJECT", the disclosure of which is incorporated herein by reference in its entirety.

FIELD

Embodiments of the present disclosure relate to the technical field of image processing, and particularly to, a method, apparatus, device, readable storage medium and product for displaying a virtual object.

BACKGROUND

When users perform video capture and processing operations on terminal devices, in order to optimize the display effects of the video, they can choose and add corresponding effect content to the video according to their actual needs, where the effect content may be associated with dynamic virtual objects.

At present, however, virtual objects generally move according to predetermined motion patterns and trajectories. Therefore, the display effects of virtual objects are relatively monotonous, and the quality of the generated video cannot meet the personalized needs of users.

SUMMARY

The embodiments of the present disclosure provide a method for displaying a virtual object, apparatus, device, readable storage medium and product for solving the technical problem of relatively monotonous virtual object display effects corresponding to current effect.

In a first aspect, an embodiment of the present disclosure provides a method for displaying a virtual object, comprising:

obtaining an effect processing request triggered by a user, the effect processing request comprising identification information of target effect;

displaying, in a media content generating page, at least one target image frame and a virtual object associated with the target effect;

determining a first motion parameter of the virtual object in a first direction based on the at least one target image frame, and determining a second motion parameter of the virtual object in a second direction based on predetermined content associated with the virtual object, wherein the predetermined content comprises skeleton animation information or a predetermined parameter; and driving, through a predetermined dynamic component, the virtual object to move according to the first motion parameter and the second motion parameter, the predetermined dynamic component being on a skeleton node corresponding to the virtual object.

In a second aspect, an embodiment of the present disclosure provides an apparatus for displaying a virtual object, comprising:

an obtaining module configured for obtaining an effect processing request triggered by a user, the effect processing request comprising identification information of target effect;

a display module configured for displaying, in a media content generating page, at least one target image frame and a virtual object associated with the target effect;

a determining module configured for determining a first motion parameter of the virtual object in a first direction based on the at least one target image frame, and determining a second motion parameter of the virtual object in a second direction based on predetermined content associated with the virtual object, wherein the predetermined content comprises skeleton animation information or a predetermined parameter; and a driving module configured for driving, through a predetermined dynamic component, the virtual object to move according to the first motion parameter and the second motion parameter, the predetermined dynamic component being on a skeleton node corresponding to the virtual object.

In a third aspect, an embodiment of the present disclosure provides an electronic device, comprising: a processor and a memory;

the memory storing computer-executed instructions;

the processor executing the computer-executed instructions stored in the memory to cause the at least one processor to perform a method for displaying a virtual object according to the first aspect and various possible designs of the first aspect.

In a fourth aspect, an embodiment of the present disclosure provides a computer readable storage medium, storing computer-executed instructions thereon. The computer-executed instructions, when executed by a processor, implement a method for displaying a virtual object according to the first aspect and various possible designs of the first aspect.

In a fifth aspect, an embodiment of the present disclosure provides a computer program product, comprising a computer program which, when executed by a processor, implements a method for displaying a virtual object according to the first aspect and various possible designs of the first aspect.

BRIEF DESCRIPTION OF THE DRAWINGS

To describe the technical solutions in the embodiments of the present disclosure or in the prior art more clearly, a brief introduction is presented below to the accompanying drawings to be used in the description of the embodiments or the prior art, Apparently, the accompanying drawings in the following description show some embodiments of the present disclosure, and for those of ordinary skill in the art, they may further derive other drawings according to these drawings without creative efforts.

DETAILED DESCRIPTION

Figure 1:
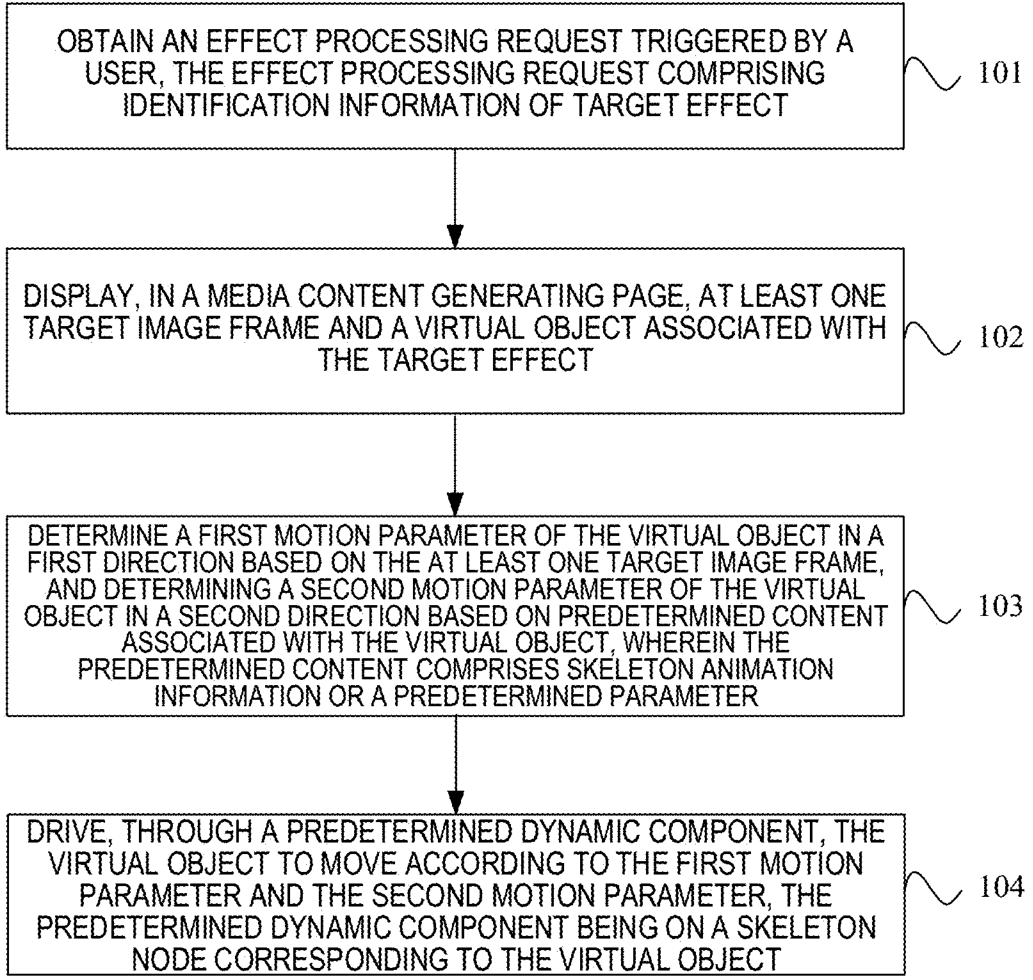
FIG. 1 is a schematic flowchart of a method for displaying a virtual object provided by an embodiment of the present disclosure.

In order to make objective, technical solutions and advantages of the embodiments of the present disclosure more apparent, a clear and complete description is presented below to the technical solutions in the embodiments of the present disclosure in conjunction with the accompanying drawings in the embodiments. Obviously, the embodiments to be described are only a part but not all of the embodiments of the present disclosure. All other embodiments obtained by those of ordinary skill in the art based on the embodiments of the present disclosure without creative efforts shall belong to the protection scope of the present disclosure.

It is to be understood that, before applying the technical solutions disclosed in respective embodiments of the present disclosure, the user should be informed of the type, scope of use, and use scenario of the personal information involved in the present disclosure in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the present disclosure.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

In order to solve the technical problem of relatively monotonous display effects of virtual objects corresponding to current effect, the present disclosure provides a method, apparatus, device, readable storage medium and product for displaying a virtual object.

It should be noted that the method, apparatus, device, readable storage medium and product for displaying the virtual object provided in the present disclosure can be applied in any application scenario of effect processing.

In the related art, some effect content can be associated with virtual objects. In response to a triggering operation of a user on effect content, a virtual object associated with the effect content can be displayed on a display interface. The virtual object generally corresponds to predetermined motion parameters, which include but are not limited to motion trajectory, motion velocity, motion acceleration, and other parameters. The virtual object can move according to the predetermined motion parameters. However, the display effects are relatively monotonous and cannot interact with users in real time.

In order to improve the matching degree between the virtual object corresponding to the effect content and an image frame currently obtained and to enrich the display effects of the virtual object, a first motion parameter of the virtual object in a first direction can be determined based on at least one image frame currently obtained, and a second motion parameter of the virtual object in a second direction can be determined based on skeleton animation information associated with the virtual object. Motion of the virtual object is controlled based on the first and second motion parameters through a dynamic component associated with the virtual object.

By means of the method, apparatus, device, readable storage medium and product for displaying the virtual object provided by the embodiments, after obtaining an effect processing request triggered by a user, at least one target image frame and a virtual object associated with target effect are displayed on a media content generating page, motion parameters of the virtual object in different directions are determined based on the at least one target image frame and predetermined content associated with the virtual object, and the virtual object is driven to move according to the first and second motion parameters based on a predetermined dynamic component on a skeleton node corresponding to the virtual object. Thus, it is possible to make the motion of the virtual object better fit the at least one target image frame. In addition, by controlling the virtual object to move through a dynamic component in combination with skeleton animation information, it is possible to make the motion of the virtual object more natural and fit the real motion scene.

FIG. 1 is a schematic flowchart of a method for displaying a virtual object provided by an embodiment of the present disclosure. As shown in FIG. 1, the method comprises:

Step 101, obtaining an effect processing request triggered by a user, the effect processing request comprising identification information of target effect.

The execution body of this embodiment is a device for displaying a virtual object. The device for displaying the virtual object can be coupled to a terminal device, so that based on the target effect selected by the user on the terminal device, the virtual object corresponding to the target effect can be driven to move through skeleton animation information in combination with a dynamic component. Alternatively, the device for displaying the virtual object can also be coupled to a server that can be communicatively connected with the terminal device. Thus, it is possible to obtain the virtual object display request sent by the terminal device based on the user's triggering operation on the target effect, drive the virtual object corresponding to the target effect to move based on the virtual object display request through the skeleton animation information in combination with the dynamic component, and control the terminal device to display the moving virtual object.

In this implementation, the user may generate video content on the terminal device, which may include at least one target image frame. The video content can be collected in real time by the user through the terminal device or uploaded in a predetermined storage path, which is not limited in the present disclosure.

In order to optimize the display effects of the video content, users can further select target effect according to their actual needs, and process the at least one target image frame corresponding to the video content based on the target effect. Accordingly, the device for displaying the virtual object can obtain an effect processing request triggered by a user, where the effect processing request comprises identification information of target effect.

Step 102, displaying, in a media content generating page, at least one target image frame and a virtual object associated with the target effect.

In this implementation, in order to optimize the display effects of video content, the target effect may be associated with a virtual object. The virtual object can be a virtual three-dimensional object, or a virtual two-dimensional image or other object. After obtaining the effect processing request, a virtual object that matches the target effect can be determined based on the identification information of the target effect, and at least one target image frame and the virtual object associated with the target effect can be displayed on a media content generating page.

Optionally, the virtual object can be a single object. For example, the virtual object can be a virtual headdress, and the number of virtual headdresses can be one. Alternatively, the virtual object can be an object composed of a plurality of objects, for example, the virtual object can be a plurality of virtual balloons.

For example, in practical applications, a virtual object corresponding to the target effect can be a plurality of virtual balloons that can move around a human body area in a target image frame.

Step 103, determining a first motion parameter of the virtual object in a first direction based on the at least one target image frame, and determining a second motion parameter of the virtual object in a second direction based on predetermined content associated with the virtual object, wherein the predetermined content comprises skeleton animation information or a predetermined parameter.

In this implementation, in order to make the motion of the virtual object better fit the at least one target image frame, the first motion parameter of the virtual object in the first direction can be determined based on the at least one target image frame. For example, in practical applications, the target image frame can include a target object, which can be the user's head. The virtual object can be virtual balloons. When the user's head turns to the left, the virtual balloons can be controlled to rotate to the left accordingly.

Furthermore, in order to enrich the motion mode of the virtual object, skeleton animation information or a predetermined parameter can also be preset for the virtual object. Therefore, the second motion parameter of the virtual object in the second direction is determined based on the predetermined content associated with the virtual object. By determining the first and second motion parameters respectively, the virtual object can move in different directions.

Continuing the above example, it can be set in the skeleton animation information that virtual balloons move upwards at a predetermined speed. Based on the first and second motion parameters, virtual balloons can be controlled to rotate left and right with the rotation of the human head during its upward movement.

Step 104, driving, through a predetermined dynamic component, the virtual object to move based on the first and second motion parameters, the predetermined dynamic component being on a skeleton node corresponding to the virtual object.

In this implementation, the virtual object may be associated with dynamic components. Therefore, after determining the first and second motion parameters respectively, the dynamic component can drive the virtual object to move based on the first and second motion parameters.

Figure 2:
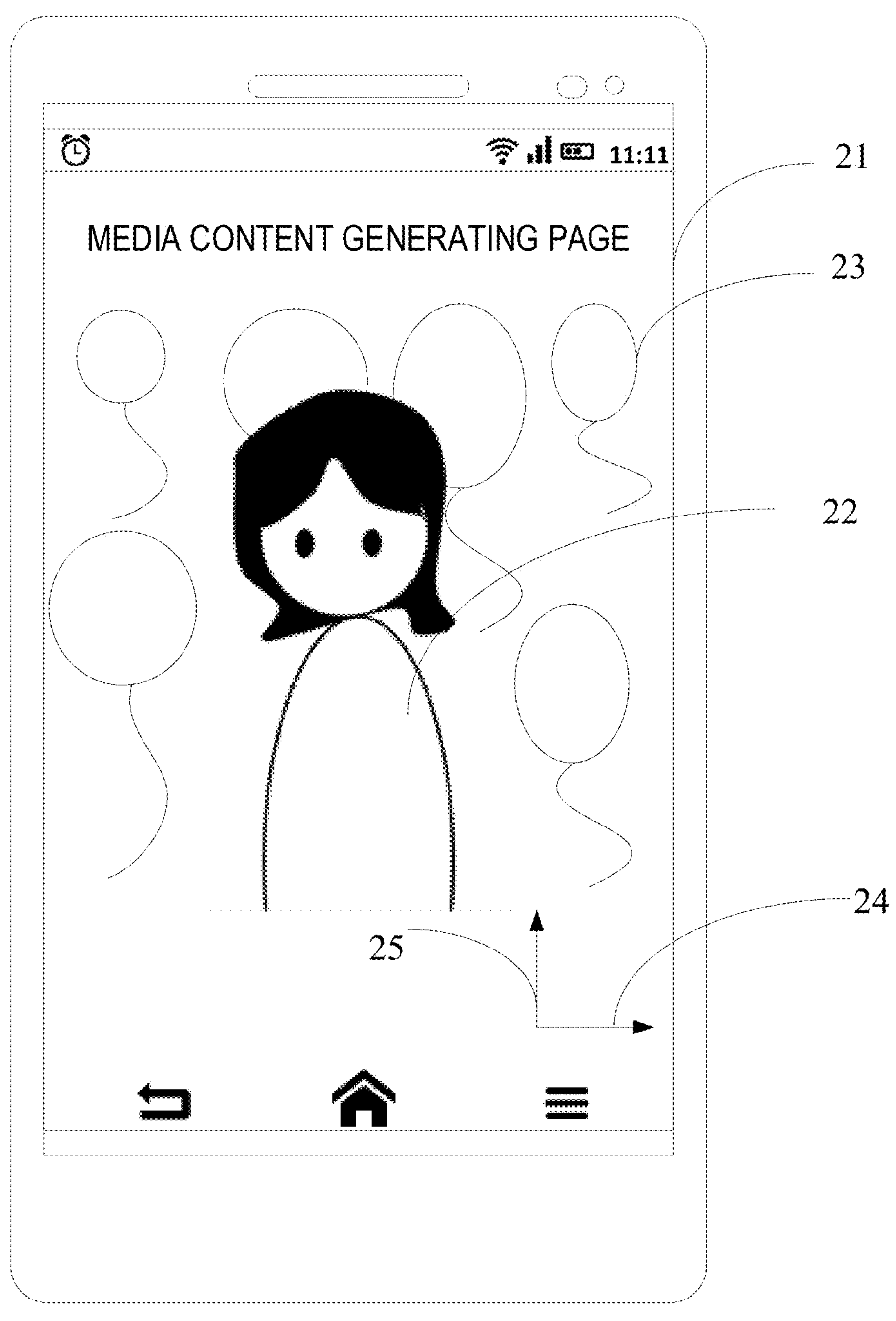
FIG. 2 is a schematic diagram of a display interface provided by an embodiment of the present disclosure.

FIG. 2 is a schematic diagram of a display interface provided by an embodiment of the present disclosure. As shown in FIG. 2, a target image frame 22 and a virtual object 23 associated with the target effect can be displayed in a media content generating page 21, here the virtual object 23 can be a plurality of virtual balloons. The virtual object 23 can move in a first direction 24 and a second direction 25 based on the drive of dynamic components.

In the method for displaying the virtual object provided by this embodiment, after obtaining an effect processing request triggered by a user, at least one target image frame and a virtual object associated with target effect are displayed on a media content generating page, motion parameters of the virtual object in different directions are determined based on the at least one target image frame and predetermined content associated with the virtual object, and the virtual object is driven to move according to the first and second motion parameters based on a predetermined dynamic component on a skeleton node corresponding to the virtual object. Thus, it is possible to make the motion of the virtual object better fit the at least one target image frame. In addition, by controlling the virtual object to move through a dynamic component in combination with skeleton animation information, it is possible to make the motion of the virtual object more natural and fit the real motion scene.

Figure 3:
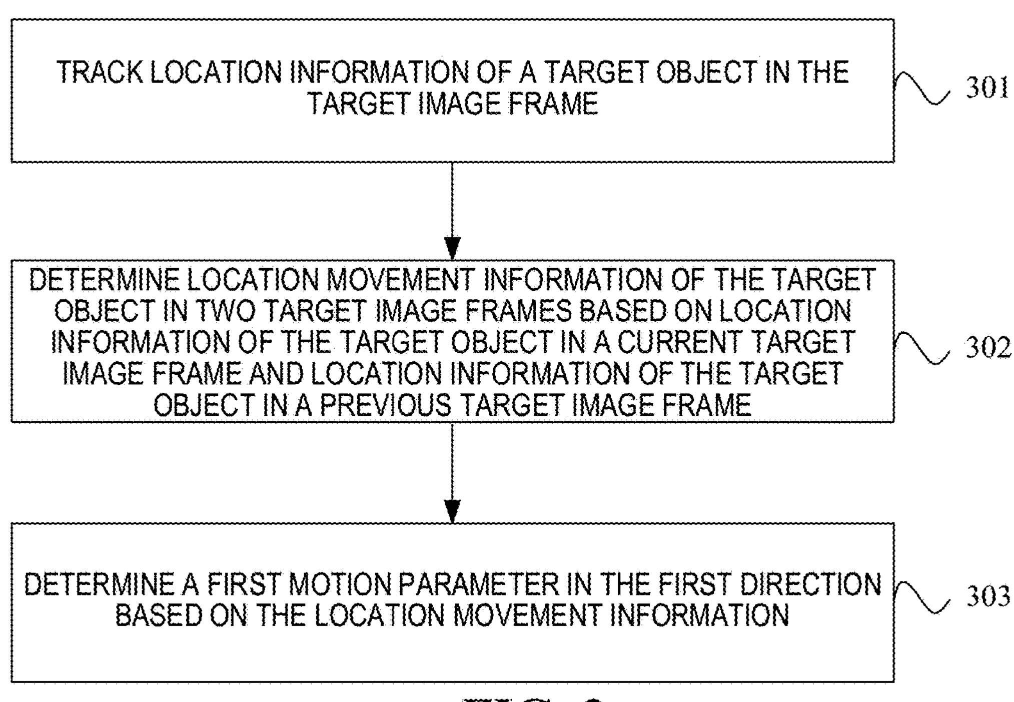
FIG. 3 is a schematic flowchart of a method for displaying a virtual object provided by another embodiment of the present disclosure.

FIG. 3 is a schematic flowchart of a method for displaying a virtual object provided by another embodiment of the present disclosure. As shown in FIG. 3, step 103 comprises:

Step 301, tracking location information of a target object in the target image frame.

Step 302, determining location movement information of the target object in two target image frames based on location information of the target object in a current target image frame and location information of the target object in a previous target image frame.

Step 303, determining a first motion parameter in the first direction based on the location movement information.

In this embodiment, the target image frame may include a target object, which includes but is not limited to user heads, user limbs, user gestures, specific objects, and other objects.

As an implementation, the user can determine the current target object based on their actual needs. For example, the target image frame can include the user's head, user limbs, user gestures, and specific objects, and the user can specify the user's head as the current target object.

In order to make the motion of the virtual object better fit the at least one target image frame, the first motion parameter of the virtual object in the first direction can be determined based on the at least one target image frame, so that the dynamic component drives the virtual object according to the first motion parameter.

Optionally, tracking operations can be performed on position information of the target object in the target image frame. Different tracking methods can be used for tracking different target objects, which is not limited in the present disclosure. For example, when the target object is the user's head, a predetermined head tracking model can be used to track the target object.

Furthermore, location movement information of the target object in two target image frames is determined based on location movement information based on location information of the target object in a current target image frame and location information of the target object in a previous target image frame. The first motion parameter in the first direction is determined according to the location movement information.

For example, if it is determined that the target object is rotated to the left by 20 degrees based on the current target image frame and the previous target image frame, it can be determined that the first motion parameter can be rotated to the left by 20 degrees.

Figure 4:
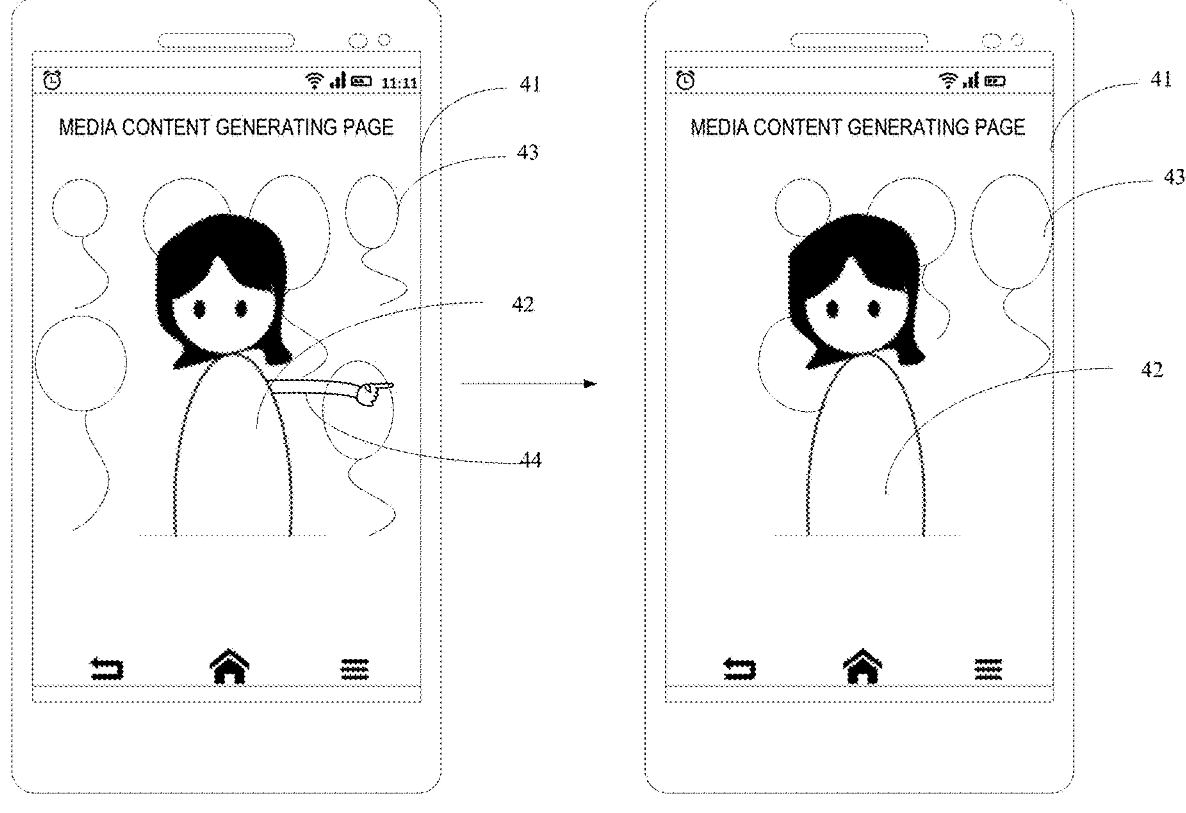
FIG. 4 is a schematic diagram of interface interaction provided by an embodiment of the present disclosure.

FIG. 4 is a schematic diagram of interface interaction provided by an embodiment of the present disclosure. As shown in FIG. 4, a target image frame 42 and a virtual object 43 associated with target effect are displayed on a media content generation page 41. The target image frame 42 can include a target object 44. For example, the target object 44 can be a user's arm, and the virtual object 43 can be a plurality of virtual balloons. In response to a movement operation of the target object 44, the virtual object 43 can move along with the movement of the target object 44.

The method for displaying the virtual object provided by this embodiment tracks the location information of the target object in the target image frame, and controls the virtual object to move according to the movement information of the target object in the current target image frame and the target object in the previous target image frame. Thus, it is possible to make the motion of the virtual object better fit the motion of the target object in the at least one target image frame, enrich the motion modes of the virtual object, and enhance the display effects within the media content generating page.

Figure 5:
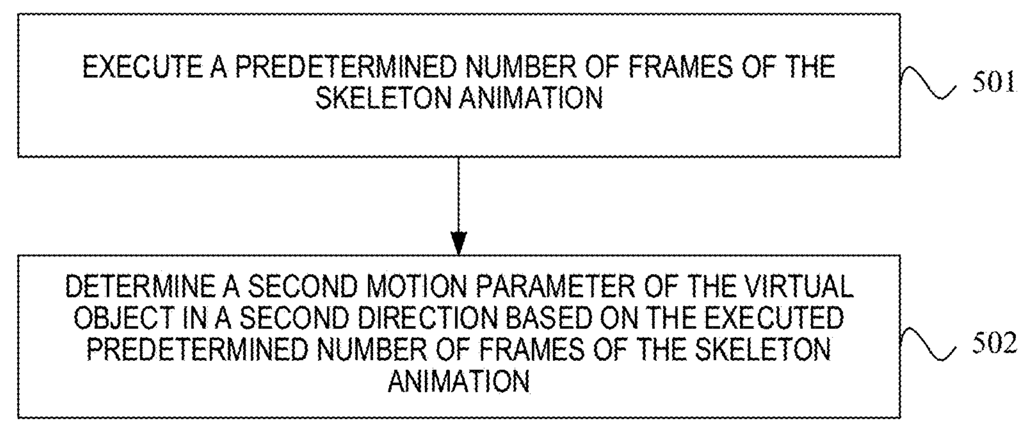
FIG. 5 is a schematic flowchart of a method for displaying a virtual object provided by a further embodiment of the present disclosure.

FIG. 5 is a schematic flowchart of a method for displaying a virtual object provided by a further embodiment of the present disclosure. Based on any of the aforementioned embodiments, the predetermined content associated with the virtual object includes predetermined skeleton animation information, wherein the skeleton animation information includes a display location of a skeleton node corresponding to the virtual object in each target image frame. Step 103 comprises:

Step 501, executing a predetermined number of frames of the skeleton animation information.

Step 502, determining the second motion parameter of the virtual object in the second direction based on the executed predetermined number of frames of the skeleton animation information.

In this embodiment, the predetermined content associated with the virtual object includes predetermined skeleton animation information, where the skeleton animation information includes a display position of a skeleton node corresponding to the virtual object in each frame of the target image. Thus, it is possible to control the virtual object to move based on the skeleton animation information.

In practical applications, if the virtual object is directly controlled to move in the first direction based on the skeleton animation information, and the virtual object is controlled to move in the second direction based on the movement information of the target object through dynamic components, when the skeleton animation information starts/stops, the virtual object is only affected by dynamics, and there might be instantaneous displacement, resulting in poor display performance.

To solve the problem of instantaneous displacement of the virtual object caused by directly combining skeleton animation information with dynamic components, a predetermined number of frames of skeleton animation information can be executed in advance. The second motion parameter of the virtual object in the second direction is determined based on the executed predetermined number of frames of the skeleton animation information. Thus, the dynamic component can drive the virtual object based on the second and first motion parameters.

The method for displaying the virtual object provided by this embodiment prioritizes the execution of skeleton animation information, and then determines the second motion parameter of the virtual object in the second direction based on the skeleton animation information. Therefore, the dynamic component can drive the virtual object to move jointly based on the first motion parameter determined according to the target object's movement information and the second motion parameter. In addition, when controlling the virtual object using the above method, the dynamic component can drive the virtual object based on the first motion parameter in combination with the second motion parameter generated according to the skeleton animation information, avoiding the problem of instantaneous displacement of the virtual object caused by directly combining the skeleton animation information with the dynamic component.

Furthermore, based on any of the aforementioned embodiments, the virtual object comprises a root node and at least one child node, wherein the root node is a parent of the at least one child node or above.

Before step 501, there is further comprised:

adding the skeleton animation information to the root node; and adding a predetermined dynamic component to the at least one child node.

In this embodiment, the virtual object can be composed of a plurality of nodes. In order to control the motion of a virtual object, the virtual object can comprise a root node and at least one child node, where the root node can be a parent of the child node and above. For example, a parent node of the child node can be the root node, or a higher-level node of the parent node of the child node can be the root node.

For example, in practical applications, the virtual object can be a plurality of virtual balloons, where the virtual object can comprise a root node and at least one child node, and each child node can be a virtual balloon. The root node is connected with respective child nodes.

By adding the skeleton animation information to the root nodes at or above the parent of the child node and adding the dynamic component to the child node, it is possible to ensure that the skeleton animation information can run before the dynamic component, thereby providing the second motion parameter for the child node based on the skeleton animation information.

To achieve the integration of skeleton animation information and dynamic components, the skeleton animation information can be added to the root node, and dynamic components are added on the at least one child node. Optionally, the child node can correspond to an independent skeleton, and specifically, dynamic components can be added to the independent skeleton corresponding to the child node.

The skeleton animation information can include a display location of the root node in each frame. Therefore, after executing the skeleton animation information in advance, the root node can move in the second direction according to the skeleton animation. Since the root node is connected with respective child nodes, the root node can provide dynamics to the respective child nodes in the second direction, and further the dynamic components installed on the respective children nodes can drive the virtual object, in combination with the first motion parameter and the second motion parameter determined based on the skeleton animation information.

Optionally, each child node can also be composed of a complete tree structure. The tree structure can comprise a first root node and at least one first child node. Skeleton animation can be added on the first root node and dynamic components can be added on the at least one first child node. Thus, it is possible to drive a single child node in a personalized way.

For example, in practical applications, the child node corresponding to the virtual object can be a transparent box, which can include a plurality of decorative content. The transparent box can be the first node, and the decorative content in the transparent box can be the first child node. Skeleton animation information can be added to the transparent box, which defines a display location of the transparent box at each frame. The transparent box can be controlled to move upwards based on the skeleton animation information. During the rising process of the transparent, dynamics can be provided to the plurality of decorative content. In addition, as the user's head rotates in the target image frame, dynamics of horizontal rotation can be provided to the decorative content. Thus, the dynamic components disposed on the decorative content can simultaneously control the decorative content to move within the transparent box based on the upward and horizontal rotational forces.

The method for displaying the virtual object provided by this embodiment adds skeleton animation information to the root node of the virtual object, and adds dynamic components to the independent skeletons of respective nodes in the virtual object. This enables the combination of skeleton animation information and dynamic components, causing the virtual object to move accordingly with the movement of the target object based on the skeleton animation information.

Furthermore, based on any of the aforementioned embodiments, step 502 comprises:

determining a second motion parameter of the root node in a second direction based on the executed predetermined number of frames of the skeleton animation information; and determining the second motion parameter of the root node in the second direction as a second motion parameter of at least one child node in the second direction of the virtual object.

In this embodiment, due to the predetermined skeleton animation information associated with the root node, the root node can move when executing the skeleton animation information. The second motion parameter of the root node in the second direction can be determined based on the executed predetermined number of frames of the skeleton animation information. A motion trend of the root node can be determined based on a location of the root node in a first frame and a location of the root node in a second frame, and a second motion parameter can be determined based on the motion trend.

Furthermore, since the virtual object comprises a root node and at least one child node, the second motion parameter of the root node in the second direction can be determined as the second motion parameter of respective nodes in the second direction among the second motion parameters of the virtual object in the second direction, so that the root node can move synchronously with the at least one child node.

Figure 6:
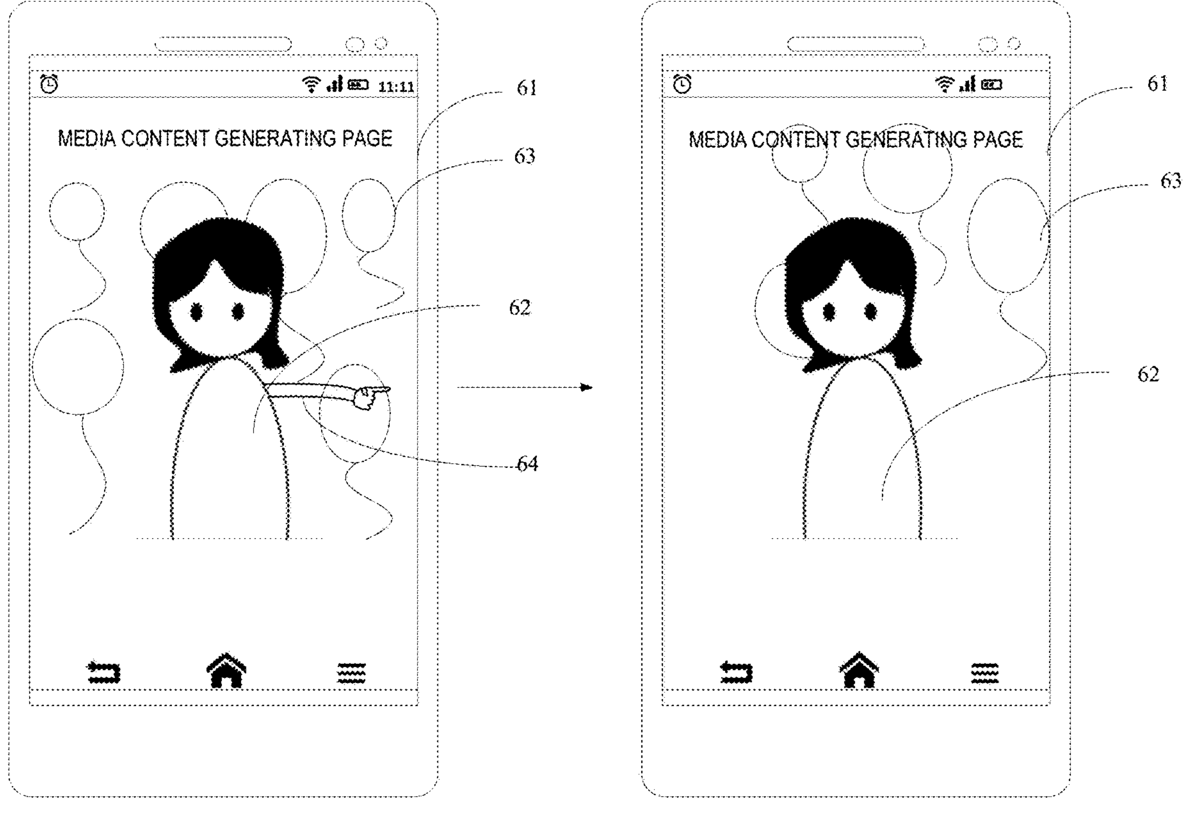
FIG. 6 is a schematic diagram of interface interaction provided by a still further embodiment of the present disclosure.

FIG. 6 is a schematic diagram of interface interaction provided by a further embodiment of the present disclosure. As shown in FIG. 6, a target image frame 62 and a virtual object 63 associated with target effect can be displayed on a media content generating page 61. The target image frame 62 can comprise a target object 64. For example, the target object 64 can be the user's arm, and the virtual object 63 can be a plurality of virtual balloons. In response to a movement operation of the target object 64 and the second motion parameter in the second direction determined based on the skeleton animation information, the virtual object 63 can move upwards while following the movement of the target object 64.

The method for displaying the virtual object provided by this embodiment prioritizes the execution of skeleton animation information and thus can accurately determine the second motion parameter of the virtual object in the second direction based on the skeleton animation information. Therefore, the dynamic component can drive the virtual object to move based on the first motion parameter determined in combination with the second motion parameter generated based on the skeleton animation information, avoiding the problem of instantaneous displacement of the virtual object caused by directly combining the skeleton animation information with the dynamic component.

Optionally, based on any of the above-mentioned embodiments, step 104 comprises:

driving the child node to move based on the first and second motion parameters according to a predetermined dynamic component on a skeleton node corresponding to the child node.

In this implementation, the at least one child node can be associated with a dynamic component. Therefore, after determining the first and second motion parameters respectively, the dynamic components associated with respective child nodes can perform driving operations on nodes based on the first and second motion parameters, to achieve driving of the virtual object.

The method for displaying the virtual object provided in this embodiment drives respective children nodes to move based on the first and second motion parameters through the predetermined dynamic components on the skeleton nodes corresponding to respective child nodes. Therefore, the dynamic components can drive the virtual object to move jointly based on the first motion parameter determined according to the target object's movement information and the second motion parameter.

Optionally, based on any of the aforementioned embodiment, the predetermined content associated with the virtual object comprises a predetermined parameter.

Step 103 comprises:

determining the predetermined parameter as the first motion parameter of the virtual object in the first direction.

In this implementation, the predetermined content associated with the virtual object comprises a predetermined parameter. In order to make the motion of virtual objects better fit the personalized needs of users, users can set predetermined parameters for virtual objects in advance.

The predetermined parameter comprises a motion parameter corresponding to the virtual object, which includes but is not limited to a predetermined motion speed, acceleration, direction, and period of the virtual object.

Therefore, the predetermined parameter can be directly determined as the first motion parameter of the virtual object in the first direction, so that the dynamic component can drive the virtual object based on the first motion parameter.

The method for displaying the virtual object provided by this embodiment allows for accurate control of the virtual object's movement in the first direction based on the dynamic component by setting a predetermined parameter.

Figure 7:
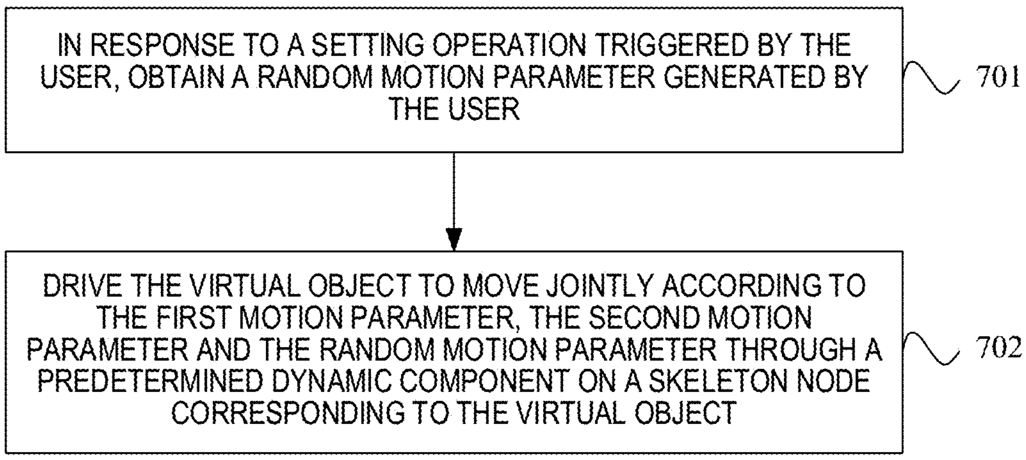
FIG. 7 is a schematic flowchart of a method for displaying a virtual object provided by a still further embodiment of the present disclosure.

FIG. 7 is a flowchart of a method for displaying a virtual object provided by a further embodiment of the present disclosure. Based on any of the aforementioned embodiments, the method further comprises:

Step 701, in response to a setting operation triggered by the user, obtaining a random motion parameter generated by the user, wherein the random motion parameter comprises one or more of an action coordinate axis, a gravity parameter range, and trigger timing.

Step 104 comprises:

Step 702, driving the virtual object to move jointly based on the first motion parameter, the second motion parameter and the random motion parameter through the predetermined dynamic component on the skeleton node corresponding to the virtual object.

In this implementation, in order to make the motion state of the virtual object more realistic, a random motion parameter can be added to the virtual object, so that the virtual object can randomly move within a small range based on the random motion parameter.

Optionally, users can set random motion parameters according to their actual needs. In response to a setting operation triggered by the user, a random motion parameter generated by the user is obtained, where the random motion parameter comprises one or more of an action coordinate axis, a gravity parameter range and trigger timing. For example, the action coordinate axis can be the X-axis and Z-axis. The gravity parameter range can be (−0.05-0.05). The trigger timing can be every N frames. In addition, to further improve the real effect of virtual object motion, a damping parameter, an elastic parameter, a rigidity parameter, a hysteresis parameter, a gravity parameter and the like can further be set in the dynamic component. The user can set one or more of the above parameters according to actual needs, which is not limited in the present disclosure.

Furthermore, the virtual object can be driven to move jointly based on the first motion parameter, the second motion parameter and the random motion parameter through the predetermined dynamic component on the skeleton node corresponding to the virtual object. Thus, the virtual object can move in the first and second directions, and can further shake at random during the motion process.

The method for displaying the virtual object provided by this embodiment obtains a random motion parameter generated by the user in response to a setting operation triggered by the user, so that the dynamic component can drive the virtual object to move jointly based on the first motion parameter, the second motion parameter and the random motion parameter. This allows the virtual object to move accordingly with the target object's movement based on skeleton animation information. In addition, the virtual object can randomly move based on the random motion parameter, making the motion of virtual objects more realistic.

Figure 8:
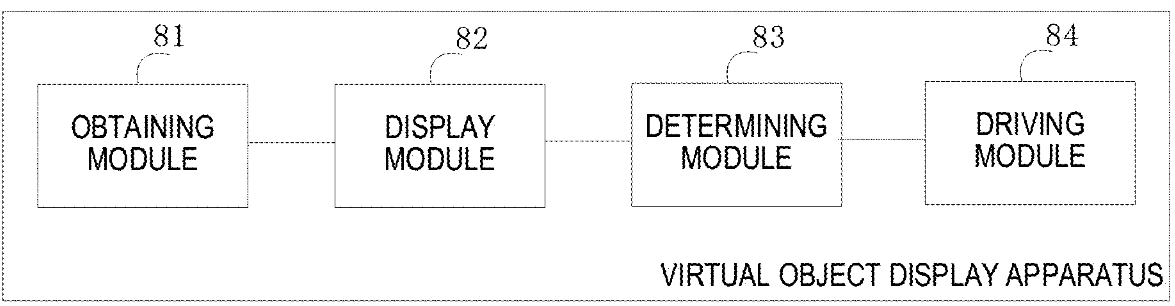
FIG. 8 is a structural schematic diagram of an apparatus for displaying a virtual object provided by an embodiment of the present disclosure.

FIG. 8 is a structural schematic diagram of an apparatus for displaying a virtual object provided by an embodiment of the present disclosure. As shown in FIG. 8, the apparatus comprises: an obtaining module 81, a display module 82, a determining module 83 and a driving module 84. The obtaining module 81 is configured for obtaining an effect processing request triggered by a user, the effect processing request comprising identification information of target effect. The display module 82 is configured for displaying, in a media content generating page, at least one target image frame and a virtual object associated with the target effect. The determining module 83 is configured for determining a first motion parameter of the virtual object in a first direction based on the at least one target image frame, and determining a second motion parameter of the virtual object in a second direction based on predetermined content associated with the virtual object, wherein the predetermined content comprises skeleton animation information or a predetermined parameter. The driving module 84 is configured for driving, through a predetermined dynamic component, the virtual object to move according to the first motion parameter and the second motion parameter, the predetermined dynamic component being on a skeleton node corresponding to the virtual object.

Further, on the basis of any of the aforementioned embodiments, the determining module is configured for: tracking location information of a target object in the target image frame; determining location movement information of the target object in two target image frames based on location information of the target object in a current target image frame and location information of the target object in a previous target image frame; and determining a first motion parameter in the first direction based on the location movement information.

Further, on the basis of any of the aforementioned embodiments, the predetermined content associated with the virtual object comprises predetermined skeleton animation information, wherein the skeleton animation information comprises a display location of a skeleton node corresponding to a virtual object in each target image frame. The determining module is configured for: executing a predetermined number of frames of the skeleton animation information; and determining a second motion parameter of the virtual object in a second direction based on the executed predetermined number of frames of the skeleton animation information.

Further, on the basis of any of the aforementioned embodiments, the virtual object comprises a root node and at least one child node, the root node being a parent of the at least one child node or above. The determining module is further configured for: adding the skeleton animation information to the root node; and adding a predetermined dynamic component to the at least one child node.

Further, on the basis of any of the aforementioned embodiments, the determining module is configured for: determining a second motion parameter of the root node in a second direction based on the executed predetermined number of frames of the skeleton animation information; and determining the second motion parameter of the root node in the second direction as a second motion parameter of at least one child node of the virtual object in the second direction.

Further, on the basis of any of the aforementioned embodiments, the driving module is configured for: driving the child node to move based on the first and second motion parameters according to a predetermined dynamic component on a skeleton node corresponding to the child node.

Further, on the basis of any of the aforementioned embodiments, the predetermined content associated with the virtual object comprises a predetermined parameter. The determining module is configured for: determining the predetermined parameter as the first motion parameter of the virtual object in the first direction.

Further, on the basis of any of the aforementioned embodiments, the apparatus further comprises: an obtaining module configured for, in response to a setting operation triggered by the user, obtaining a random motion parameter generated by the user, wherein the random motion parameter comprises one or more of an action coordinate axis, a gravity parameter range, and trigger timing. The driving module is configured for driving, through a predetermined dynamic component, the virtual object to move jointly based on the first motion parameter, the second motion parameter and the random motion parameter, the predetermined dynamic component being on a skeleton node corresponding to the virtual object.

The device provided in this embodiment can be used to perform the technical solution of the above-mentioned method embodiments, with similar implementation principles and technical effects, which are not repeated here.

In order to achieve the above-mentioned embodiments, an embodiment of the present disclosure further provides an electronic device, comprising: a processor and a memory;

the memory storing computer-executed instructions;

the computer-executed instructions stored in the memory, when executed by the processor, causing the processor to perform a method for displaying a virtual object as described in any of the aforementioned embodiments.

Figure 9:
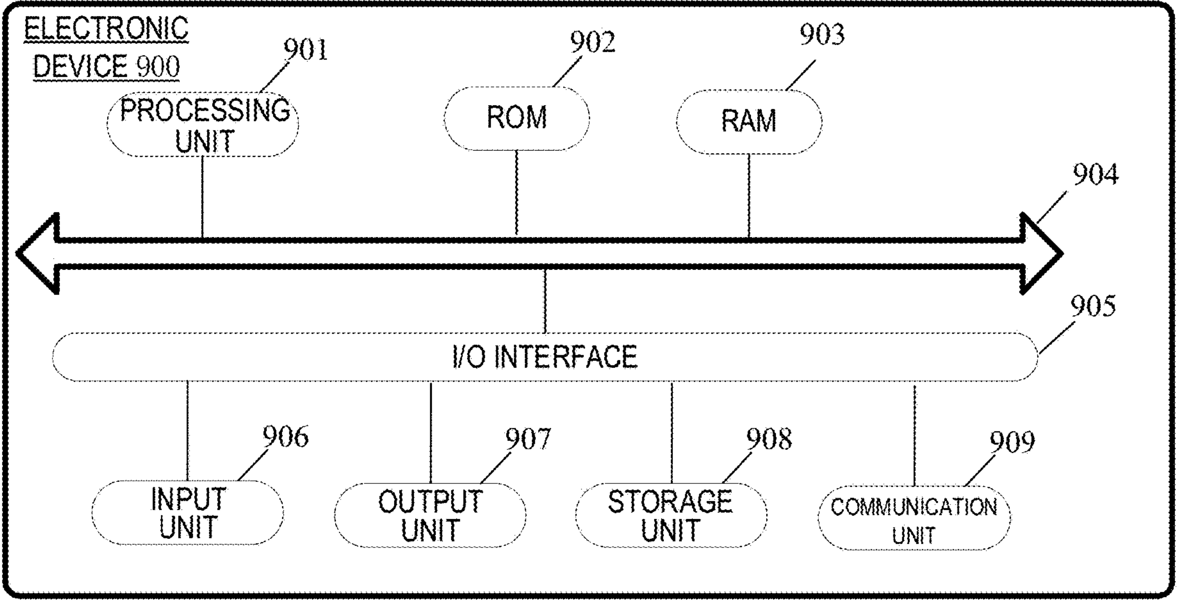
FIG. 9 is a structural schematic diagram of an electronic device provided by an embodiment of the present disclosure.

FIG. 9 is a structural schematic diagram of an electronic device provided by an embodiment of the present disclosure. As shown in FIG. 9, the electronic device 900 can be a terminal device or a server. The terminal device may include, without limitation to, a mobile terminal such as a mobile phone, a notebook computer, a digital broadcast receiver, a personal digital assistant (PDA), a portable Android device (PAD), a portable multimedia player (PMP), an on-board terminal (e.g., an on-board navigation terminal) and the like, as well as a fixed terminal such as digital TV, a desktop computer and the like. The electronic device shown in FIG. 9 is merely an example and should not be construed as bringing any restriction on the functionality and usage scope of the embodiments of the present disclosure.

As shown in FIG. 9, the electronic device 900 may comprise a processing unit (e.g., a central processor, a graphics processor) 901 which is capable of performing various appropriate actions and processes to realize the method of table processing as described in the embodiments of the present disclosure in accordance with programs stored in a read only memory (ROM) 902 or programs loaded from a storage unit 908 to a random access memory (RAM) 903. In the RAM 903, there are also stored various programs and data required by the electronic device 900 when operating. The processing unit 901, the ROM 902 and the RAM 903 are connected to one another via a bus 904. An input/output (I/O) interface 905 is also connected to the bus 904.

Usually, the following units may be connected to the I/O interface 905: an input unit 906 including a touch screen, a touch pad, a keyboard, a mouse, a camera, a microphone, an accelerometers, a gyroscope, or the like; an output unit 907, such as a liquid-crystal display (LCD), a loudspeaker, a vibrator, or the like; a storage unit 908, such as a magnetic tape, a hard disk or the like; and a communication unit 909. The communication unit 909 allows the electronic device 900 to perform wireless or wired communication with other device so as to exchange data with other device. While FIG. 6 shows the electronic device 900 with various units, it should be understood that it is not required to implement or have all of the illustrated units. Alternatively, more or less units may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication unit 909, or installed from the storage unit 908, or installed from the ROM 902. The computer program, when executed by the processing unit 901, perform the above functions defined in the method of the embodiments of the present disclosure.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

To implement the above embodiments, an embodiment of the present disclosure further provide a computer readable storage medium, storing computer-executed instructions thereon. The computer-executed instructions, when executed by a processor, implement a method for displaying a virtual object as described in any of the above embodiments.

To implement the above embodiments, an embodiment of the present disclosure further provide a computer program product, comprising a computer program. The computer program, when executed by a processor, implements a method for displaying a virtual object as described in any of the above embodiments.

The above computer readable medium may be included in the above-mentioned electronic device; and it may also exist alone without being assembled into the electronic device.

The computer readable medium carries one or more programs which, when executed by the electronic device, cause the electronic device to perform the method described in the above embodiments.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units described in the embodiments of the present disclosure may be implemented as software or hardware, wherein the name of a unit does not form any limitation to the unit per se in some case. For example, the first obtaining unit may be further described as a "unit configured for obtaining at least two Internet protocol addresses".

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In a first aspect, according to one or more embodiments of the present disclosure, a method for displaying a virtual object is provided, comprising:

obtaining an effect processing request triggered by a user, the effect processing request comprising identification information of target effect;

displaying, in a media content generating page, at least one target image frame and a virtual object associated with the target effect;

determining a first motion parameter of the virtual object in a first direction based on the at least one target image frame, and determining a second motion parameter of the virtual object in a second direction based on predetermined content associated with the virtual object, wherein the predetermined content comprises skeleton animation information or a predetermined parameter; and driving, through a predetermined dynamic component, the virtual object to move according to the first motion parameter and the second motion parameter, the predetermined dynamic component being on a skeleton node corresponding to the virtual object.

According to one or more embodiments of the present disclosure, the determining a first motion parameter of the virtual object in a first direction based on the at least one target image frame comprises:

tracking location information of a target object in the target image frame;

determining location movement information of the target object in two target image frames based on location information of the target object in a current target image frame and location information of the target object in a previous target image frame; and determining a first motion parameter in the first direction based on the location movement information.

According to one or more embodiments of the present disclosure, the predetermined content associated with the virtual object comprises predetermined skeleton animation information, wherein the skeleton animation information comprises a display location of a skeleton node corresponding to a virtual object in each target image frame;

the determining a second motion parameter of the virtual object in a second direction based on predetermined content associated with the virtual object comprises:

executing a predetermined number of frames of the skeleton animation information; and determining a second motion parameter of the virtual object in a second direction based on the executed predetermined number of frames of the skeleton animation information.

According to one or more embodiments of the present disclosure, the virtual object comprises a root node and at least one child node, the root node being a parent of the at least one child node or above;

before executing a predetermined number of frames of the skeleton animation information, there is further comprised:

adding the skeleton animation information to the root node; and adding a predetermined dynamic component to the at least one child node.

According to one or more embodiments of the present disclosure, the determining a second motion parameter of the virtual object in a second direction based on the executed predetermined number of frames of the skeleton animation information comprises:

determining a second motion parameter of the root node in a second direction based on the executed predetermined number of frames of the skeleton animation information; and determining the second motion parameter of the root node in the second direction as a second motion parameter of at least one child node of the virtual object in the second direction.

According to one or more embodiments of the present disclosure, the driving the virtual object to move according to the first and second motion parameters through a predetermined dynamic component on a skeleton node corresponding to the virtual object comprises:

Driving, through a predetermined dynamic component, the child node to move according to the first and second motion parameters, the predetermined dynamic component being on a skeleton node corresponding to the child node.

According to one or more embodiments of the present disclosure, the predetermined content associated with the virtual object comprises a predetermined parameter.

Determining a second motion parameter of the virtual object in a second direction based on predetermined content associated with the virtual object comprises:

determining the predetermined parameter as the first motion parameter of the virtual object in the first direction.

According to one or more embodiments of the present disclosure, the method further comprises:

in response to a setting operation triggered by the user, obtaining a random motion parameter generated by the user, wherein the random motion parameter comprises one or more of an action coordinate axis, a gravity parameter range, and trigger timing;

the driving the virtual object to move according to the first and second motion parameters through a predetermined dynamic component on a skeleton node corresponding to the virtual node comprises:

driving, through a predetermined dynamic component, the virtual object to move jointly according to the first motion parameter, the second motion parameter and the random motion parameter, the predetermined dynamic component being on a skeleton node corresponding to the virtual object.

In a second aspect, according to one or more embodiments of the present disclosure, an apparatus for displaying a virtual object is provided, comprising:

an obtaining module configured for obtaining an effect processing request triggered by a user, the effect processing request comprising identification information of target effect;

a display module configured for displaying, in a media content generating page, at least one target image frame and a virtual object associated with the target effect;

a determining module configured for determining a first motion parameter of the virtual object in a first direction based on the at least one target image frame, and determining a second motion parameter of the virtual object in a second direction based on predetermined content associated with the virtual object, wherein the predetermined content comprises skeleton animation information or a predetermined parameter; and a driving module configured for driving, through a predetermined dynamic component, the virtual object to move according to the first motion parameter and the second motion parameter, the predetermined dynamic component being on a skeleton node corresponding to the virtual object.

According to one or more embodiments of the present disclosure, the determining module is configured for:

tracking location information of a target object in the target image frame;

determining location movement information of the target object in two target image frames based on location information of the target object in a current target image frame and location information of the target object in a previous target image frame; and determining a first motion parameter in the first direction based on the location movement information.

According to one or more embodiments of the present disclosure, the predetermined content associated with the virtual object comprises predetermined skeleton animation information, wherein the skeleton animation information comprises a display location of a skeleton node corresponding to a virtual object in each target image frame;

the determining module is configured for:

executing a predetermined number of frames of the skeleton animation information; and determining a second motion parameter of the virtual object in a second direction based on the executed predetermined number of frames of the skeleton animation information.

According to one or more embodiments of the present disclosure, the virtual object comprises a root node and at least one child node, the root node being a parent of the at least one child node or above;

the determining module is further configured for:

adding the skeleton animation information to the root node; and adding a predetermined dynamic component to the at least one child node.

According to one or more embodiments of the present disclosure, the determining module is configured for:

determining a second motion parameter of the root node in a second direction based on the executed predetermined number of frames of the skeleton animation information; and determining the second motion parameter of the root node in the second direction as a second motion parameter of at least one child node of the virtual object in the second direction.

According to one or more embodiments of the present disclosure, the driving module is configured for:

driving, through a predetermined dynamic component, the child node to move according to the first and second motion parameters, the predetermined dynamic component being on a skeleton node corresponding to the child node.

According to one or more embodiments of the present disclosure, the predetermined content associated with the virtual object comprises a predetermined parameter;

the determining module is configured for:

determining the predetermined parameter as the first motion parameter of the virtual object in the first direction.

According to one or more embodiments of the present disclosure, the apparatus further comprises:

an obtaining module configured for, in response to a setting operation triggered by the user, obtaining a random motion parameter generated by the user, wherein the random motion parameter comprises one or more of an action coordinate axis, a gravity parameter range, and trigger timing;

the driving module is configured for:

driving, through a predetermined dynamic component, the virtual object to move jointly according to the first motion parameter, the second motion parameter and the random motion parameter, the predetermined dynamic component being on a skeleton node corresponding to the virtual object.

In a third aspect, according to one or more embodiments of the present disclosure, an electronic device is provided, comprising: at least one processor and a memory;

the memory storing computer-executed instructions;

the at least one processor executing the computer-executed instructions stored in the memory to cause the at least one processor to perform a method for displaying a virtual object according to the first aspect and various possible designs of the first aspect.

In a fourth aspect, according to one or more embodiments of the present disclosure, a computer readable storage medium is provided, storing computer-executed instructions thereon. The computer-executed instructions, when executed by a processor, implement a method for displaying a virtual object according to the first aspect and various possible designs of the first aspect.

In a fifth aspect, according to one or more embodiments of the present disclosure, a computer program product is provided, comprising a computer program which, when executed by a processor, implements a method for displaying a virtual object according to the first aspect and various possible designs of the first aspect.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

The invention claimed is:

1. A method for displaying a virtual object, comprising:

obtaining an effect processing request triggered by a user, the effect processing request comprising identification information of target effect;

displaying, in a media content generating page, at least one target image frame and the virtual object associated with the target effect;

determining a first motion parameter of the virtual object in a first direction based on the at least one target image frame, and determining a second motion parameter of the virtual object in a second direction based on predetermined content associated with the virtual object, wherein the predetermined content comprises skeleton animation information or a predetermined parameter, skeleton nodes corresponding to the virtual object comprise a root node and at least one child node, the root node being a parent of the at least one child node or above, and determining the second motion parameter comprises:

adding the skeleton animation information to the root node; and adding a predetermined dynamic component to the at least one child node; and driving, through the predetermined dynamic component, the virtual object to move according to the first motion parameter and the second motion parameter, the predetermined dynamic component being on the skeleton nodes corresponding to the virtual object.

2. The method of claim 1, wherein determining the first motion parameter of the virtual object in the first direction based on the at least one target image frame comprises:

tracking location information of a target object in the at least one target image frame;

determining location movement information of the target object in two target image frames based on location information of the target object in a current target image frame and location information of the target object in a previous target image frame; and determining the first motion parameter in the first direction based on the location movement information.

3. The method of claim 1, wherein the predetermined content associated with the virtual object comprises the skeleton animation information, wherein the skeleton animation information comprises a display location of the virtual object in each of the at least one target image frame;

determining the second motion parameter of the virtual object in the second direction based on the predetermined content associated with the virtual object comprises:

executing a predetermined number of frames of the skeleton animation information; and determining the second motion parameter of the virtual object in the second direction based on the executed predetermined number of frames of the skeleton animation information.

4. The method of claim 3, wherein determining the second motion parameter of the virtual object in the second direction based on the executed predetermined number of frames of the skeleton animation information comprises:

determining the second motion parameter of the root node in the second direction based on the executed predetermined number of frames of the skeleton animation information; and determining the second motion parameter of the root node in the second direction as the second motion parameter of the at least one child node of the virtual object in the second direction.

5. The method of claim 1, wherein driving, through the predetermined dynamic component, the virtual object to move according to the first motion parameter and the second motion parameter, the predetermined dynamic component being on the skeleton nodes corresponding to the virtual object comprises:

driving, through the predetermined dynamic component, the at least one child node to move according to the first motion parameter and the second motion parameter, the predetermined dynamic component being on a skeleton node corresponding to the at least one child node.

6. The method of claim 1, wherein the predetermined content associated with the virtual object comprises a predetermined parameter;

determining the second motion parameter of the virtual object in the second direction based on predetermined content associated with the virtual object comprises:

determining the predetermined parameter as the first motion parameter of the virtual object in the first direction.

7. The method of claim 1, wherein the method further comprises:

in response to a setting operation triggered by the user, obtaining a random motion parameter generated by the user, wherein the random motion parameter comprises one or more of an action coordinate axis, a gravity parameter range, and trigger timing;

wherein, driving, through the predetermined dynamic component, the virtual object to move according to the first motion parameter and the second motion parameter, the predetermined dynamic component being on the skeleton nodes corresponding to the virtual object comprises:

driving, through the predetermined dynamic component, the virtual object to move jointly according to the first motion parameter, the second motion parameter and the random motion parameter.

8. An electronic device, comprising: a processor and a memory;

the memory storing computer-executed instructions;

the processor executing the computer-executed instructions stored in the memory to cause the processor to implement a method for displaying a virtual object, comprising:

obtaining an effect processing request triggered by a user, the effect processing request comprising identification information of target effect;

displaying, in a media content generating page, at least one target image frame and the virtual object associated with the target effect;

determining a first motion parameter of the virtual object in a first direction based on the at least one target image frame, and determining a second motion parameter of the virtual object in a second direction based on predetermined content associated with the virtual object, wherein the predetermined content comprises skeleton animation information or a predetermined parameter, skeleton nodes corresponding to the virtual object comprise a root node and at least one child node, the root node being a parent of the at least one child node or above, and determining the second motion parameter comprises:

adding the skeleton animation information to the root node; and adding a predetermined dynamic component to the at least one child node; and driving, through the predetermined dynamic component, the virtual object to move according to the first motion parameter and the second motion parameter, the predetermined dynamic component being on the skeleton nodes corresponding to the virtual object.

9. The device of claim 8, wherein determining the first motion parameter of the virtual object in the first direction based on the at least one target image frame comprises:

tracking location information of a target object in the at least one target image frame;

determining location movement information of the target object in two target image frames based on location information of the target object in a current target image frame and location information of the target object in a previous target image frame; and determining the first motion parameter in the first direction based on the location movement information.

10. The device of claim 8, wherein the predetermined content associated with the virtual object comprises the skeleton animation information, wherein the skeleton animation information comprises a display location of the virtual object in each of the at least one target image frame;

determining the second motion parameter of the virtual object in the second direction based on the predetermined content associated with the virtual object comprises:

executing a predetermined number of frames of the skeleton animation information; and determining the second motion parameter of the virtual object in the second direction based on the executed predetermined number of frames of the skeleton animation information.

11. The device of claim 10, wherein determining the second motion parameter of the virtual object in the second direction based on the executed predetermined number of frames of the skeleton animation information comprises:

determining the second motion parameter of the root node in the second direction based on the executed predetermined number of frames of the skeleton animation information; and determining the second motion parameter of the root node in the second direction as the second motion parameter of the at least one child node of the virtual object in the second direction.

12. The device of claim 8, wherein driving, through the predetermined dynamic component, the virtual object to move according to the first motion parameter and the second motion parameter, the predetermined dynamic component being on the skeleton nodes corresponding to the virtual object comprises:

driving, through the predetermined dynamic component, the at least one child node to move according to the first motion parameter and the second motion parameter, the predetermined dynamic component being on a skeleton node corresponding to the at least one child node.

13. The device of claim 8, wherein the predetermined content associated with the virtual object comprises a predetermined parameter;

determining the second motion parameter of the virtual object in the second direction based on predetermined content associated with the virtual object comprises:

determining the predetermined parameter as the first motion parameter of the virtual object in the first direction.

14. The device of claim 8, wherein the method further comprises:

in response to a setting operation triggered by the user, obtaining a random motion parameter generated by the user, wherein the random motion parameter comprises one or more of an action coordinate axis, a gravity parameter range, and trigger timing;

wherein, driving, through the predetermined dynamic component, the virtual object to move according to the first motion parameter and the second motion parameter, the predetermined dynamic component being on the skeleton nodes corresponding to the virtual object comprises:

driving, through the predetermined dynamic component, the virtual object to move jointly according to the first motion parameter, the second motion parameter and the random motion parameter.

15. A non-transitory computer readable storage medium, wherein the computer readable storage medium stores computer-executed instructions which, when executed by a processor, implement a method for displaying a virtual object, obtaining an effect processing request triggered by a user, the effect processing request comprising identification information of target effect;

displaying, in a media content generating page, at least one target image frame and the virtual object associated with the target effect;

determining a first motion parameter of the virtual object in a first direction based on the at least one target image frame, and determining a second motion parameter of the virtual object in a second direction based on predetermined content associated with the virtual object, wherein the predetermined content comprises skeleton animation information or a predetermined parameter, skeleton nodes corresponding to the virtual object comprise a root node and at least one child node, the root node being a parent of the at least one child node or above, and determining the second motion parameter comprises:

adding the skeleton animation information to the root node; and adding a predetermined dynamic component to the at least one child node; and driving, through the predetermined dynamic component, the virtual object to move according to the first motion parameter and the second motion parameter, the predetermined dynamic component being on the skeleton nodes corresponding to the virtual object.

16. The medium of claim 15, wherein determining the first motion parameter of the virtual object in the first direction based on the at least one target image frame comprises:

tracking location information of a target object in the at least one target image frame;

determining location movement information of the target object in two target image frames based on location information of the target object in a current target image frame and location information of the target object in a previous target image frame; and determining the first motion parameter in the first direction based on the location movement information.

17. The medium of claim 15, wherein the predetermined content associated with the virtual object comprises the skeleton animation information, wherein the skeleton animation information comprises a display location of the virtual object in each of the at least one target image frame;

determining the second motion parameter of the virtual object in the second direction based on the predetermined content associated with the virtual object comprises:

executing a predetermined number of frames of the skeleton animation information; and determining the second motion parameter of the virtual object in the second direction based on the executed predetermined number of frames of the skeleton animation information.

* * * * *